(12) United States Patent
Chen et al.

(10) Patent No.: US 9,092,532 B2
(45) Date of Patent: Jul. 28, 2015

(54) METHOD AND SERVER FOR SEARCHING FOR NEARBY USER IN SOCIAL NETWORKING SERVICES

(71) Applicant: TENCENT TECHNOLOGY (SHENZHEN) COMPANY LIMITED, Shenzhen (CN)

(72) Inventors: Junchao Chen, Shenzhen (CN); Zhonghua Lai, Shenzhen (CN); Haochuan Cui, Shenzhen (CN); Yu Wu, Shenzhen (CN); Cuilong Ma, Shenzhen (CN); Jingqiong Feng, Shenzhen (CN); Tianqing Huang, Shenzhen (CN); Wa Ye, Shenzhen (CN); Xiangyao Lin, Shenzhen (CN); Xueqin Lin, Shenzhen (CN); Yuxuan Zhang, Shenzhen (CN); Kunfeng Rong, Shenzhen (CN); Guo Ling, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/277,319

(22) Filed: May 14, 2014

(65) Prior Publication Data
US 2014/0258281 A1    Sep. 11, 2014

Related U.S. Application Data

(63) Continuation of application No. PCT/CN2012/079561, filed on Aug. 2, 2012.

(30) Foreign Application Priority Data

Nov. 16, 2011    (CN) .......................... 2011 1 0363120

(51) Int. Cl.
*G06F 17/30* (2006.01)
*G06Q 10/10* (2012.01)
*G06Q 50/00* (2012.01)

(52) U.S. Cl.
CPC ...... *G06F 17/30867* (2013.01); *G06F 17/3053* (2013.01); *G06F 17/30241* (2013.01); *G06Q 10/10* (2013.01); *G06Q 50/01* (2013.01)

(58) Field of Classification Search
CPC .......... G06F 17/3053; G06F 17/30867; G06F 17/30241; G06Q 50/01
See application file for complete search history.

(56) References Cited

U.S. PATENT DOCUMENTS

| 2009/0106778 A1* | 4/2009 | Pomeroy et al. ............... 719/328 |
| 2010/0205242 A1* | 8/2010 | Marchioro et al. ........... 709/203 |

(Continued)

FOREIGN PATENT DOCUMENTS

| CN | 1908588 A | 2/2007 |
| CN | 101203041 A | 6/2008 |

(Continued)

OTHER PUBLICATIONS

International Search Report for Application No. PCT/CN2012/079561 dated Dec. 6, 2012, and its English translation thereof.

(Continued)

*Primary Examiner* — Tarek Chbouki
(74) *Attorney, Agent, or Firm* — Harness, Dickey & Pierce, P.L.C.

(57) ABSTRACT

When location information and a user Identification (ID) is received from a client terminal device of a user X, a grid Y, to which the location information belongs, is determined. The user ID and the location information of the user X is stored in a list of the grid Y. The grid Y is in a grid array obtained by dividing a surface of the earth into the grids and areas of the grids are the same. Users in the grid Y and other grids are searched. The grid Y and the other grids form an N-grid and the grid Y is a center of the N-grid. The users are ranked in an ascending order of distances between the users and the user X. The ranked user IDs and distances between the users and the user X are sent to the client terminal device of the user X.

5 Claims, 3 Drawing Sheets

(56) References Cited

U.S. PATENT DOCUMENTS

| | | | |
|---|---|---|---|
| 2011/0055264 A1* | 3/2011 | Sundelin et al. | 707/776 |
| 2013/0054698 A1* | 2/2013 | Lee et al. | 709/204 |

FOREIGN PATENT DOCUMENTS

| | | | |
|---|---|---|---|
| CN | 101783080 A | 7/2010 |
| CN | 102004793 A | 4/2011 |
| CN | 102088419 A | 6/2011 |
| CN | 102098388 A | 6/2011 |
| CN | 102147261 A | 8/2011 |
| CN | 102162854 A | 8/2011 |
| CN | 102571910 A | 7/2012 |
| WO | 2011003232 A1 | 1/2011 |

OTHER PUBLICATIONS

Written Opinion of the International Searching Authority for PCT/CN2012/079561 mailed Dec. 6, 2012, and its English translation thereof.

Extended European Search Report for Application No. 12849877.1 dated Nov. 5, 2014.

Mexican Office Action for Application No. MX/a/2014/005906 dated Feb. 26, 2015, and its English translation thereof.

\* cited by examiner

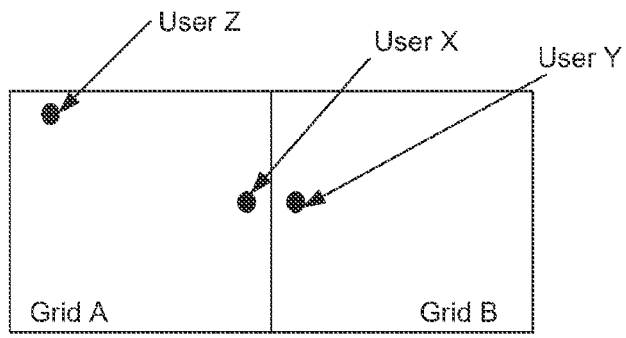

Fig. 1

```
┌─────────────────────────────────────────────────────────────┐
│ A surface of the earth may be divided into a grid array, in │──── 21
│ which an area of each grid is the same. A list may be set   │
│ for a grid.                                                 │
└─────────────────────────────────────────────────────────────┘
                              │
                              ▼
┌─────────────────────────────────────────────────────────────┐
│ When location information and a user ID is received from a  │
│ client terminal device of a user X, a grid Y, to which the  │──── 22
│ location information belongs may be determined. As for the  │
│ user X, the user ID and location information of the user X  │
│ may be stored in list of the grid Y                         │
└─────────────────────────────────────────────────────────────┘
                              │
                              ▼
┌─────────────────────────────────────────────────────────────┐
│ Users in the grid Y and other grids may be searched out.    │──── 23
│ The grid Y and the other grids may form an N-grid and the   │
│ grid Y may be the center of the N-grid. Wherein, N = n*n    │
│ and n is an odd larger than or equal to 3                   │
└─────────────────────────────────────────────────────────────┘
                              │
                              ▼
┌─────────────────────────────────────────────────────────────┐
│ Users which are searched out may be ranked in an ascending  │
│ order of distances between the user X and the users and the │──── 24
│ ranked user IDs of the users and distances between the user │
│ X and the user may be sent to the client terminal device of │
│ the user X                                                  │
└─────────────────────────────────────────────────────────────┘
```

Fig. 2

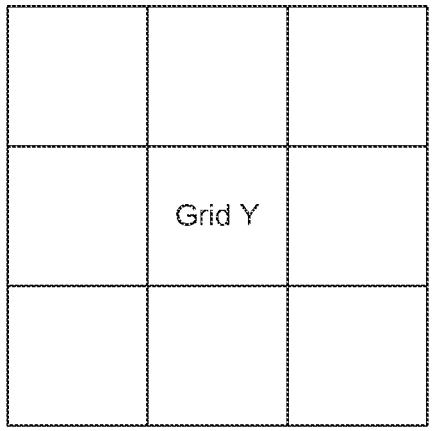

Fig. 3

| 41 — A surface of the earth may be divided into a grid array, in which an area of each grid may be the same. A list may be set for a grid |

| 42 — When location information and a user ID is received from a client terminal device of a user X, a grid Y, to which the location information belongs may be determined. As for the user X, the user ID, location information and reporting time of the user X may be stored in list of the grid Y |

| 43 — Users in the grid Y and other grids may be searched out. The grid Y and the grid may form an N-grid and the grid Y may be the center of the N-grid. Wherein, N▯ n*n and n may be an odd larger than or equal to 3 |

| 44 — Users may be ranked according to the distances between the users and the user X and the reporting time and ranked user IDs of the users and distances between the user X and the users may be sent to the client terminal device of the user X. The closer the distance between the user X and a user is, the higher the rank of the user is. The shorter the time between the reporting time of the user and the current time is, the higher the rank of the user is |

Fig. 4

METHOD AND SERVER FOR SEARCHING FOR NEARBY USER IN SOCIAL NETWORKING SERVICES

CROSS-REFERENCE TO RELATED APPLICATIONS

This application is a continuation of PCT/CN2012/079561, filed on Aug. 2, 2012, which claims the benefit of priority from Chinese Patent Application, No. 201110363120.4, entitled "Method and Server for Searching for Nearby User in Social Networking Services (SNS)" and filed on Nov. 16, 2011, the entire contents of which are hereby incorporated by reference.

FIELD

The present disclosure relates to Method and Server for Searching For Nearby User in Social Networking Services.

BACKGROUND

This section provides background information related to the present disclosure which is not necessarily prior art.

In SNS, a user may search for nearby users and contact with a user to make friends with the user or seek the user's help, etc.

SUMMARY

This section provides a general summary of the disclosure, and is not a comprehensive disclosure of its full scope or all of its features.

The present disclosure provides methods and servers for searching for nearby users in Social Networking Services (SNS), to enhance accuracy of a searching result.

A method for searching for nearby users in Social Networking Services (SNS) includes the following:
  receiving location information and a user Identification (ID) from a client terminal device of a user X;
  determining a grid Y, to which the location information belongs;
  storing the user ID and the location information of the user X in a list of the grid Y; wherein the grid Y is one of grids in a grid array obtained by dividing a surface of the earth into the grids and areas of the grids are the same;
  searching for users in the grid Y and other girds; wherein the grid Y and the other grids form an N-grid and the grid Y is a center of the N-grid, $N=n*n$, n is an odd larger than or equal to 3;
  ranking the users in an ascending order of distances between the users the user X; and
  sending the ranked user IDs of the users and distances between the users and the user X to the client terminal device of the user X.

A method for searching for nearby users in Social Networking Services (SNS) includes the following:
  receiving location information and a user Identification (ID) from a client terminal device of a user X;
  determining a grid Y, to which the location information belongs;
  saving the user ID, the location information and reporting time of the user X in a list of the grid Y; wherein the grid Y is one of grids in a grid array obtained by dividing a surface of the earth into the grids and areas of the grids are the same;
  searching for users in the grid Y and other girds; wherein the grid Y and the other grids form an N-grid and the grid Y is a center of the N-grid, $N=n*n$, n is an odd larger than or equal to 3;
  ranking the users according to distances between the users and the user X and the reporting time of the user X; wherein the closer a distance between a user and the user X, the higher rank of the user is, and the shorter time between the reporting time of the user and a current time is, the higher the rank of the user is; and
  sending the ranked user IDs of the users and the distances between the users and the user X to the client terminal device of the user X.

A server includes the following:
  a first processing module, to divide a surface of the earth into a grid array, in which an area of each grid is the same, and set a list for a grid; and
  a second processing module, when location information and a user Identification (ID) from a client terminal device of a user X is received, to determine a grid Y, to which the location information belongs, store the user ID and the location information of the user X in a list of the grid Y, search for users in the grid Y and other girds, in which the grid Y and the other grids form an N-grid and the grid Y is a center of the N-grid, $N=n*n$ and n is an odd larger than or equal to 3, rank the users in an ascending order of distances between the users the user X and send the ranked user IDs of the users and distances between the users and the user X to the client terminal device of the user X.

A server includes the following:
  a first processing module, to divide a surface of the earth into a grid array, in which an area of each grid is the same, and set a list for a grid; and
  a second processing module, when location information and a user Identification (ID) from a client terminal device of a user X is received, to determine a grid Y, to which the location information belongs, store the user ID, the location information and reporting time of the user X in a list of the grid Y, search for users in the grid Y and other girds, in which the grid Y and the other grids form an N-grid and the grid Y is a center of the N-grid, $N=n*n$ and n is an odd larger than or equal to 3, rank the users according to distances between the users and the user X and the reporting time of the user X and send the ranked user IDs of the users and distances between the users and the user X to the client terminal device of the user X; wherein the closer a distance between a user and the user X, the higher rank of the user is, and the shorter time between the reporting time of the user and a current time is, the higher the rank of the user is.

With the technical scheme of the present disclosure, the searching is performed in the grid, at which the user X is located and nearby grids of the grid. The users which are searched out are ranked according to an ascending order of the distances between the users and the user X. Even a user is not located in the above grid, if the distance between the user the user X is short, the user may be searched out and sent to the user X, which may enhance the accuracy of the result of the searching. In addition, in the scheme of the present disclosure, the ranking may be further performed according to the reporting time in addition to the location information and the user ID of the user X. The shorter time between the reporting time of the user and a current time is, the more likely the user X may get in touch with the user and the higher the rank of the user is, which may enhance the accuracy of the searching result.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a diagram illustrating a location of a user X;

FIG. 2 is a flow chart illustrating a method for searching for nearby users in SNS in accordance with various embodiments of the present disclosure;

FIG. 3 is a diagram illustrating a 9-grid formed by a Y grid and nearby grids;

FIG. 4 is a flow chart illustrating another method for searching for nearby users in the SNS in accordance with various embodiments of the present disclosure;

Corresponding reference numerals indicate corresponding parts throughout the several views of the drawings.

DETAILED DESCRIPTION

Figure 5:
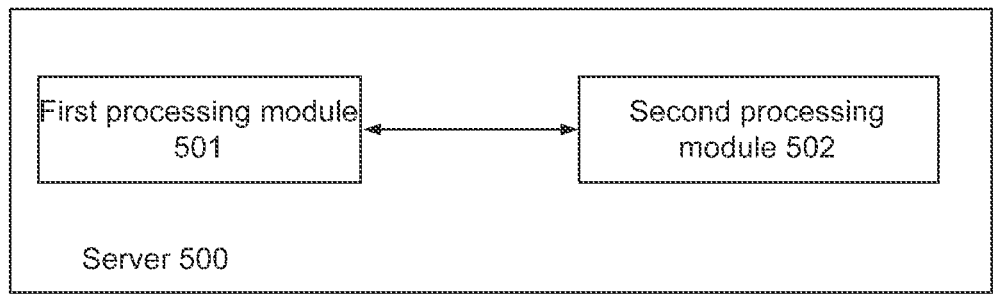
FIG. 5 is a diagram illustrating structure of a server in accordance with various embodiments of the present disclosure.

Example embodiments will now be described more fully with reference to the accompanying drawings.

For simplicity and illustrative purposes, the present disclosure is described by referring mainly to non-limiting examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Nearby users may be searched via following methods. According to longitude and latitude information, a server may divide a surface of the earth in to a grid array, in which the area of each grid is the same. As for any user X, when the user X needs to search for nearby users, the user X may send his/her location information and a user Identification (ID) to a server via a client terminal device used by the user X. The client terminal device may be a mobile terminal device. The location information may be the longitude and latitude information. After the server receives the location information from the user X, the server first may determine a grid, to which the location information belongs. Then, the server may search for other users in this grid, search for user IDs of the other users and distances between the other users and the user X and send the user IDs and the distances to the client terminal device of the user X.

However, there are some drawbacks in the above method. The user X may be close to a boundary of two adjacent grids.

FIG. 1 is a schematic diagram illustrating a location of the user X. As shown in FIG. 1, two adjacent grids may be grid A and grid B. The user X and user Z are located at the grid A and the user Y is located at the grid B. As for the user X, the distance between the user X and the user Y is shorter than that between the user X and the user Z. If the user X seeks for help, the user Y is obviously a better choice than the user Z. According to an example, the user X may search for the user Z but cannot search for the user Y, resulting in inaccurate searching result.

In order to enhance the accuracy of the searching result, the present disclosure provides a scheme for searching for nearby users.

FIG. 2 is a flow chart illustrating a method for searching for nearby users in SNS in accordance with various embodiments of the present disclosure. As shown in FIG. 2, the method includes the following blocks.

In block 21, a surface of the earth may be divided into a grid array, in which an area of each grid may be the same. A list may be set for a grid. According to various embodiments, a list may be set for each grid.

According to an example of the present disclosure, the surface of the earth may be divided into the grid array. Areas of grids in the grid array may be different or may be the same.

According to longitude and latitude information, the surface of the earth may be divided into the grid array, in which the area of each grid may be the same. The area of the grid may be configured as needed, such as one square kilometers.

The list may be empty at an initial stage.

In block 22, when location information and a user ID is received from a client terminal device of a user X, a grid Y, to which the location information belongs may be determined. As for the user X, the user ID and location information of the user X may be stored in list of the grid Y.

The location information may be the longitude and latitude information. Since the grids are divided according to the longitude and latitude information, the grid, to which the received location information belongs, may be determined.

For the convenience of description, in various example of the present disclosure, any user may be denoted by the user X and the grid, to which the user X is located is denoted by the grid Y.

After determining the grid Y, the received user ID and location information may be stored in the list of the grid Y. Therefore, if another user searches for nearby users in the grid Y, the user X may be found.

It should be noted that the user X may search for nearby users repeatedly. The user ID and the location information may be reported many times. In this example, the user ID and the location information of the user X may be stored in the list of the grid Y to ensure the uniqueness of the user information.

For example, assume that the user X is in a grid A and reports his/her user ID and location information. The user ID and location information of the user X may be stored in a list of the grid A. Then, if the gird, at which the user X is located, is changed to a grid B, the user X may report his/her user ID and location information again. Therefore, the user ID and location information of the user X stored in the list of the grid A may be deleted and the user ID and the location information of the user X may be stored in the list of the grid B.

In block 23, users in the grid Y and other grids may be searched out. The grid Y and the other grids may form an N-grid and the grid Y may be the center of the N-grid. Wherein, N=n*n and n is an odd larger than or equal to 3.

The structure of the N-grid may ensure that users on each direction around the user X may be found.

The value of n may be determined according to actual requirements. For example, compared with sparsely populated cities, such as Qinghai and Neimenggu, in densely populated cities, such as Guangzhou, Beijing and Shanghai, the value of N may be 5 or 7, etc.

FIG. 3 is a diagram illustrating a 9-grid formed by a Y grid and nearby grids.

If the N-grid in this block is the 9-grid shown in FIG. 3, users in the list of the 9-grid may be the users which are searched out, except for the user X.

In block 24, users which are searched out may be ranked in an ascending order of distances between the user X and the users and the ranked user IDs of the users. Distances between the user X and the user may be sent to the client terminal device of the user X.

Since the location information of the users which are searched out may be known, the location information of the user X may be known. Therefore, the distances between the user X and the users which are searched out may be computed and the ranking of the user may be performed.

The searching scope in examples of the present disclosure may be enlarged. Therefore, the number of the users which are searched out is increased. For the user X, users ranked lower are usually not included. Therefore, the information of these users needs not to be sent to the user X, which may reduce the amount of transmitted data and save bandwidth resources, etc.

After the ranking is finished, whether the number of users which are searched out is less than or equal to M may be determined. If the number of the users which are searched out is less than or equal to M, the user IDs of the users and the distances between the user X and the users may be sent to the client terminal device of the user X. If the number of the users which are searched out is larger than M, the user IDs of users among top M and the distances between the user X and the users among the top M may be sent to the client terminal device of the user X. M may be a positive integer larger than one. The value of M may be determined according to actual requirements.

Other information besides the user IDs of the users and the distances between the user X and the users, such as avatars of the users, may be sent to the client terminal device of the user X.

FIG. 4 is a flow chart illustrating another method for searching for nearby users in the SNS in accordance with various embodiments of the present disclosure. As shown in FIG. 4, the method may include the following blocks.

In block 41, a surface of the earth may be divided into a grid array, in which an area of each grid may be the same. A list may be set for a grid.

According to an example of the present disclosure, the surface of the earth may be divided into the grid array. Areas of grids in the grid array may be different or may be the same.

In block 42, when location information and a user ID is received from a client terminal device of a user X, a grid Y, to which the location information belongs may be determined. As for the user X, the user ID, location information, and reporting time of the user X may be stored in list of the grid Y.

In block 43, users in the grid Y and other grids may be searched out. The grid Y and the grid may form an N-grid and the grid Y may be the center of the N-grid. Wherein, N=n*n and n may be an odd larger than or equal to 3.

In block 44, users which are searched out may be ranked according to the distances between the users and the user X and the reporting time and ranked user IDs of the users and distances between the user X and the users may be sent to the client terminal device of the user X. The closer the distance between the user X and a user is, the higher the rank of the user is. The shorter the time between the reporting time of the user and the current time is, the higher the rank of the user is.

Compared with the example shown in FIG. 2, when the ranking is performed in this example, the reporting time may be taken into consideration. In block 42, the report time of the user ID and the location information of the user X may be stored in the list of the grid Y.

In block 44, a weight of a user i $A_i = a*D_i + b*T_i$ may be computed, a and b are weighting coefficients and values of a and b may be determined as needed. $D_i$ denotes the distance between the user i and the user X. $T_i$ denotes the time between the current time and the reporting time of the user i. The users are ranked in an ascending order of weight.

After the ranking is finished, whether the number of users which are searched out is less than or equal to M may be determined. If the number of the users which are searched out is less than or equal to M, the user IDs of the users and the distances between the user X and the users may be sent to the client terminal device of the user X. If the number of the users which are searched out is larger than M, the user IDs of the users among top M and the distances between the user X and the users among the top M may be sent to the client terminal device of the user X. M may be a positive integer larger than one.

In the above two examples, the client terminal device of the user X may obtain the location information of the user X with the following methods. That is, the client terminal device of the user X may obtain the location information of the user X via method one to method L. After the location information of the user X is obtained, the client terminal device may report the location information. If the location information of the user X is not obtained with a method, the client terminal device of the user X may obtain the location information with a next method. L may be a positive integer larger than one. As for different methods, the smaller the number is, the higher the accuracy of the location information is.

The value of L may be three. Method one may obtain the location information via a Global Positioning System (GPS) function. Method two may obtain the location information via a Cell ID of an eNode B. Method three may obtain the location information via a Media Access Control (MAC) address of a connected Wireless Fidelity (WiFi) access point.

The description of the methods in examples of the present disclosure is finished.

On the basis of the above description, FIG. 5 is a diagram illustrating the structure of a server in accordance with various embodiments of the present disclosure. As shown in FIG. 5, the server 500 may include:

a first processing module 501, to divide a surface of the earth into a grid array, in which area of each grid may be the same and set a list for a grid; and a second processing module 502, when location information and a user Identification (ID) from a client terminal device of a user X is received, to determine a grid Y, to which the location information belongs, store the user ID and the location information of the user X in a list of the grid Y, search for users in the grid Y and other girds, in which the grid Y and the other grids form an N-grid and the grid Y is a center of the N-grid, N=n*n, n is an odd larger than or equal to 3, rank the users in an ascending order of distances between the users the user X, and send the ranked user IDs of the users and distances between the users and the user X to the client terminal device of the user X.

The second processing module 502 may further determine whether the number of the users is less than or equal to M after the users are ranked, send the ranked user IDs of the users and distances between the users and the user X to the client terminal device of the user X if the number of the users is less than or equal to M, and send ranked user IDs of users among top M and distances between the users among the top M and the user X to the client terminal device of the user X if the number of the users is larger than M; wherein M may be a positive integer larger than one.

According to another example of the present disclosure, the server may include the following:

a first processing module 501, to divide a surface of the earth into a grid array, in which an area of each grid may be the same and set a list for a grid;

a second processing module 502, when location information and a user Identification (ID) from a client terminal device of a user X is received, to determine a grid Y, to which the location information belongs, store the user ID, the location information and reporting time of the user X in a list of the grid Y, search for users in the grid Y and other girds, in which the grid Y and the other grids form an N-grid and the grid Y is a center of the N-grid, N=n*n, n is an odd larger than or equal to 3, rank the users according to distances between the users and the user X and the reporting time of the user X and send the ranked user IDs of the users and distances between the users and the user X to the client terminal device of the user X; wherein the closer a distance between a user and the user X is, the higher rank of the user is, and the shorter time between the reporting time of the user and a current time is, the higher the rank of the user is.

According to an example of the present disclosure, the first processing module 501 may divide the surface of the earth into the grid array. Areas of grids in the grid array may be different or may be the same.

The second processing module 502 may further compute a weight $A_i=a*D_i+b*T_i$ of a user i; wherein a and b are weighting coefficients, $D_i$ is a distance between the user i and the user X, $T_i$ is time between the current time and the reporting time of the user i and rank the users in an ascending order of the weight.

The second processing module 502 may further determine whether the number of the users is less than or equal to M after the users are ranked, send the ranked user IDs of the users and distances between the users and the user X to the client terminal device of the user X if the number of the users is less than or equal to M, and send ranked user IDs of users among top M and distances between the users among the top M and the user X to the client terminal device of the user X if the number of the users is larger than M; wherein M may be a positive integer larger than one.

Figure 6:
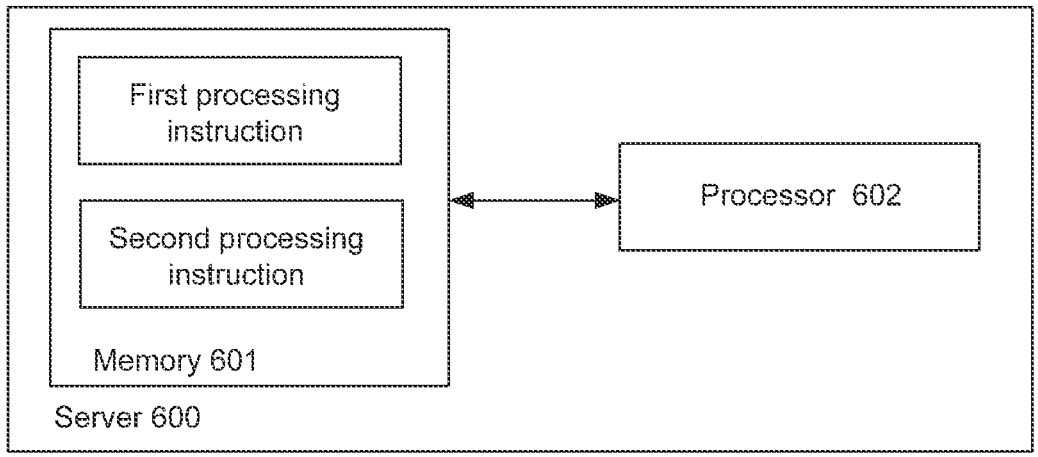
FIG. 6 is a diagram illustrating structure of another server in accordance with an example of the present disclosure and FIG. 7 is s diagram illustrating structure of another server in accordance with an example of the present disclosure.

FIG. 6 is a schematic diagram illustrating structure of another server in accordance with an example of the present disclosure.

The server 600 may include a memory 601 and a processor 602.

The memory 601 may store a first processing instruction and a second processing instruction.

The processor 602 may communicate with the memory 601 to execute the first processing instruction, to divide a surface of the earth into a grid array, in which an area of each grid may be the same and set a list for a grid;

execute the second processing instruction to, when location information and a user Identification (ID) from a client terminal device of a user X is received, to determine a grid Y, to which the location information belongs, store the user ID and the location information of the user X in a list of the grid Y, search for users in the grid Y and other girds, in which the grid Y and the other grids form an N-grid and the grid Y is a center of the N-grid, N=n*n, n is an odd larger than or equal to 3, rank the users in an ascending order of distances between the users the user X and send the ranked user IDs of the users and distances between the users and the user X to the client terminal device of the user X.

According to an example of the present disclosure, the surface of the earth may be divided into the grid array. Areas of grids in the grid array may be different or may be the same.

According to an example, the processor 602 may further execute the second processing instruction, to determine whether number of the users is less than or equal to M after the user are ranked, send the ranked user IDs of the users and distances between the users and the user X to the client terminal device of the user X if the number of the users is less than or equal to M and send ranked user IDs of users among top M and distances between the users among the top M and the user X to the client terminal device of the user X if the number of the users is larger than M; wherein M is a positive integer larger than one.

Figure 7:
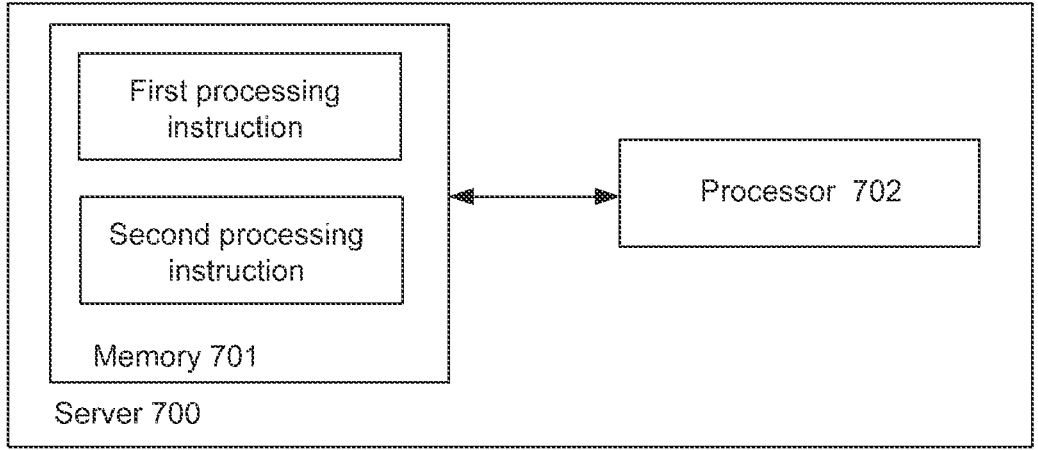

FIG. 7 is a schematic diagram illustrating structure of another server in accordance with an example of the present disclosure.

The server 700 may include a memory 701 and a processor 702.

The memory 701 may store a first processing instruction and a second processing instruction.

The processor 702 may communicate with the memory 701 and execute the first processing instruction, to divide a surface of the earth into a grid array, in which an area of each grid may be the same and set a list for a grid; and the second processing instruction, when location information and a user Identification (ID) from a client terminal device of a user X is received, to determine a grid Y, to which the location information belongs, store the user ID, the location information and reporting time of the user X in a list of the grid Y, search for users in the grid Y and other girds, in which the grid Y and the other grids form an N-grid and the grid Y is a center of the N-grid, N=n*n is an odd larger than or equal to 3, rank the users according to distances between the users and the user X and the reporting time of the user X and send the ranked user IDs of the users and distances between the users and the user X to a client terminal device of the user X; wherein the closer a distance between a user and the user X is, the higher rank of the user is, and the shorter time between the reporting time of the user and a current time is, the higher the rank of the user is.

The processor 702 may further execute the second processing instruction to compute a weight $A_i=a*D_i+b*T_i$ of a user i; wherein a and b are weighting coefficients, $D_i$ is a distance between the user I and the user X, $T_i$ is time between the current time and the reporting time of the user i and rank the users in an ascending order of the weight.

The processor 702 may further execute the second processing module to determine whether number of the users is less than or equal to M after the users are ranked, send the ranked user IDs of the users and distances between the users and the user X to the client terminal device of the user X if the number of the users is less than or equal to M and send ranked user IDs of users among top M and distances between the users among the top M and the user X to the client terminal device of the user X if the number of the users is larger than M; wherein M is a positive integer larger than one.

With the technical scheme of the present disclosure, the searching is performed in the grid, at which the user X is located, and in nearby grids of the grid. The users which are searched out are ranked according to an ascending order of the distances between the users and the user X. Even when a user is not located in the above grid, if the distance between the user the user X is short, the user may be searched out and sent to the user X, which may enhance the accuracy of the result of the searching. In addition, in the scheme of the present disclosure, the ranking may be further performed according to the reporting time in addition to the location information and the user ID of the user X. The shorter the time between the reporting time of the user and the current time, the more likely the user X may get in touch with the user and the higher the rank of the user is, which may enhance the accuracy of the searching result.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The foregoing only describes preferred embodiments of the present invention. The protection scope of the present invention, however, is not limited to the above description. Any change or substitution, easily occurring to those skilled in the art, should be covered by the protection scope of the present invention. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

When location information and a user Identification (ID) is received from a client terminal device of a user X, a grid Y, to which the location information belongs, is determined. The user ID and the location information of the user X is stored in a list of the grid Y. The grid Y is in a grid array obtained by dividing a surface of the earth into the grids and areas of the grids are the same. Users in the grid Y and other grids are searched. The grid Y and the other grids form an N-grid and the grid Y is a center of the N-grid. The users are ranked in an ascending order of distances between the users and the user X. The ranked user IDs and distances between the users and the user X are sent to the client terminal device of the user X.

What is claimed is:

1. A method for searching for nearby users in Social Networking Services (SNS) applied to a computer comprising a storage and a processor, which executes instructions stored in the storage to execute steps of:

receiving location information and a user Identification (ID) from a client terminal device of a user X; determining a grid Y, to which the location information belongs;

saving the user ID, the location information and reporting time of the user X in a list of the grid Y; wherein the grid Y is one of grids in a grid array obtained by dividing a surface of the earth into the grids and areas of the grids are the same;

searching for users in the grid Y and other girds; wherein the grid Y and the other grids form an N-grid and the grid Y is a center of the N-grid, N=n*n, n is an odd larger than or equal to 3;

ranking the users according to distances between the users and the user X and the reporting time of the user X; wherein the closer a distance between a user and the user X, the higher rank of the user is, and the shorter time between the reporting time of the user and a current time is, the higher the rank of the user is; and sending the ranked user IDs of the users and the distances between the users and the user X to the client terminal device of the user X, wherein the ranked user IDs of the users are received by the user X and used by the user X to contact other users;

wherein ranking the users according to the distances between the users and the user X and the reporting time of the user X comprises:

computing a weight $A_i=a*D_i+b*T_i$ of a user i; wherein a and b are weighting coefficients, $D_i$ is a distance between the user i and the user X, $T_i$ is time between the current time and the reporting time of the user i; and ranking the users in an ascending order of the weight.

2. The method according to claim 1, wherein sending the ranked user IDs of the users and distances between the users and the user X to the client terminal device of the user X comprises:

determining whether number of the users is less than or equal to M;

sending the ranked user IDs of the users and distances between the users and the user X to the client terminal device of the user X if the number of the users is less than or equal to M; and sending ranked user IDs of top M users and distances between the top M users and the user X to the client terminal device of the user X if the number of the users is larger than M; wherein M is a positive integer larger than one.

3. The method according to claim 1, wherein before receiving the location information of the user X, the method further comprises:

obtaining, by the client terminal device of the user X, the location information of the user X according to any of method one to method three; wherein method one is a Global Positioning System (GPS) function, method two is a Cell ID of an eNode B and method three is a Media Access Control (MAC) address of a connected Wireless Fidelity (WiFi) access point;

reporting, by the client terminal device of the user X, the location information of the user X if the location information of the user X is successfully obtained with one of the method one to method three; and obtaining, by the client terminal device of the user X, the location information of the user X with another method of the method one to method three if the location information of the user X is not successfully obtained with the one of method one to method three.

4. A server, comprising: a processor and a storage;
wherein the storage comprises: a first processing module and a second processing module, wherein
the first processing module executed by the processor, to divide a surface of the earth into a grid array, in which an area of each grid is the same, and set a list for a grid;
the second processing module executed by the processor, when location information and a user Identification (ID) from a client terminal device of a user X is received, to determine a grid Y, to which the location information belongs, store the user ID, the location information and reporting time of the user X in a list of the grid Y, search for users in the grid Y and other girds, in which the grid Y and the other grids form an N-grid and the grid Y is a center of the N-grid, N=n*n and n is an odd larger than or equal to 3, rank the users according to distances between the users and the user X and the reporting time of the user X and send the ranked user IDs of the users and distances between the users and the user X to the client terminal device of the user X; wherein the closer a distance between a user and the user X is, the higher rank of the user is, and the shorter time between the reporting time of the user and a current time is, the higher the rank of the user is;

wherein the ranked user IDs of the users are received by the user X and used by the user X to contact other users;

wherein the second processing module is further executed by the processor to compute a weight $A_i=a*D_i+b*T_i$ of a user i; wherein a and b are weighting coefficients, $D_i$ is a distance between the user i and the user X, $T_i$ is time between the current time and the reporting time of the user i and rank the users in an ascending order of the weight.

5. The server according to claim 4, wherein the second processing module is further executed by the processor to determine whether number of the users is less than or equal to M after the users are ranked, send the ranked user IDs of the users and distances between the users and the user X to the client terminal device of the user X if the number of the users is less than or equal to M and send ranked user IDs of top M users and distances between the top M users and the user X to the client terminal device of the user X if the number of the users is larger than M; wherein M is a positive integer larger than one.

* * * * *